(12) United States Patent
Durbin et al.

(10) Patent No.: US 8,267,827 B2
(45) Date of Patent: Sep. 18, 2012

(54) FINAL DRIVE HAVING A LUBRICATION SYSTEM

(75) Inventors: Brian D. Durbin, Waverly, IA (US); Tammo Wagner, Davenport, IA (US)

(73) Assignee: Deere & Company, Moline, IL (US)

( * ) Notice: Subject to any disclaimer, the term of this patent is extended or adjusted under 35 U.S.C. 154(b) by 248 days.

(21) Appl. No.: 12/834,119

(22) Filed: Jul. 12, 2010

(65) Prior Publication Data
US 2012/0010037 A1  Jan. 12, 2012

(51) Int. Cl.
*F16H 57/04* (2010.01)
(52) U.S. Cl. .......................................... 475/159
(58) Field of Classification Search .................. None
See application file for complete search history.

(56) References Cited

U.S. PATENT DOCUMENTS

| | | | | |
|---|---|---|---|---|
| 2,027,012 A * | 1/1936 | Barnes | ........................ | 184/13.1 |
| 2,182,889 A | 9/1937 | Carlson et al. | | |
| 3,138,222 A * | 6/1964 | Dames et al. | ................ | 184/11.2 |
| 3,635,312 A * | 1/1972 | Kaufman | .................... | 184/11.1 |
| 3,941,219 A | 3/1976 | Myers | | |
| 4,175,643 A * | 11/1979 | Jenkins | ........................ | 184/11.2 |
| 4,961,485 A | 10/1990 | Huff et al. | | |
| 5,316,106 A | 5/1994 | Baedke et al. | | |
| 5,358,456 A * | 10/1994 | Deppert et al. | ............... | 475/154 |
| 6,398,687 B2 * | 6/2002 | Iwata | ........................... | 475/160 |
| 6,997,284 B1 * | 2/2006 | Nahrwold | .................... | 184/6.12 |
| 8,167,758 B2 * | 5/2012 | Downs et al. | ................. | 475/160 |
| 2005/0247537 A1 | 11/2005 | Kuhn | | |
| 2009/0114498 A1 | 5/2009 | Arnold et al. | | |
| 2010/0057270 A1 | 3/2010 | Hudson et al. | | |
| 2011/0281680 A1 * | 11/2011 | Forssberg | ..................... | 475/160 |

FOREIGN PATENT DOCUMENTS

| | | |
|---|---|---|
| DE | 2033271 | 1/1972 |
| DE | 4011022 | 10/1990 |
| GB | 2192957 | 1/1988 |
| JP | 2001271916 | 10/2001 |

OTHER PUBLICATIONS

German Search Report, Mar. 26, 2012, 5 pages.

* cited by examiner

*Primary Examiner* — Dirk Wright

(57) ABSTRACT

A final drive comprising a lubrication system is provided. The final drive comprises an axle housing and a differential housing. The differential housing is in alignment with the axle housing, and they share a longitudinal axis. The final drive further comprises a lubricant ring having a lubricant ring inner diameter. The lubricant ring travels about an inner surface of the axle housing. Further, the final drive has a longitudinal axis region, defined as the region formed by the lubricant ring inner diameter. The lubrication system comprises a lubrication inlet in fluid communication with a lubricant outlet. The lubrication inlet is disposed in the axle housing to capture a portion of the lubricant ring. The lubricant outlet is disposed in the differential housing to distribute the portion of the lubricant ring generally to the longitudinal axis region.

18 Claims, 4 Drawing Sheets

FINAL DRIVE HAVING A LUBRICATION SYSTEM

FIELD OF THE DISCLOSURE

The present disclosure relates to a work machine comprising a final drive. More specifically, the present disclosure relates to a final drive having a lubrication system.

BACKGROUND OF THE DISCLOSURE

A work machine utilizes a drivetrain to transmit power from an engine to a set of wheels. In the drivetrain, a clutch transmits engine power to a transmission, and the transmission transmits power to a final drive. The final drive comprises a differential gearset, a planetary gearset, a differential housing, and an axle housing. An input shaft transmits power from the differential gearset to the planetary gearset, and an output shaft transmits power from the planetary gearset to the set of wheels. The planetary gearset and the differential gearset operate in conjunction with a lubricant.

In the planetary gearset, there is a sun gear, a ring gear, a carrier, pins, and planets. The planet gears are meshed between the ring gear and the sun gear, and the planet gears turn on their own pins and around the sun gear. The pins are engaged with the carrier to ensure that the planet gears are equally spaced. The carrier may be connected to the output shaft.

The final drive further comprises a brake assembly. In the brake assembly, there is a friction disc splined to the input shaft. To prevent rotation of the friction disc and input shaft, a piston, a piston plate, and a reaction plate sandwich the friction disc. The friction disc has grooves on each of its sides to facilitate the flow of the lubricant.

When the planetary gearset and friction disc rotate at a high speed, they cause the lubricant to rotate. As the lubricant rotates, centrifugal forces cause it to travel in a radial direction away from the rotational axis of the input shaft. Accordingly, the lubricant travels in a rotational direction and in a radial direction, and this causes the lubricant to travel about the inner surfaces of the differential and axle housings in the form of a lubricant ring. Under these circumstances, the lubricant may not cover the entire friction disc. Accordingly, there is a need for a final drive having a lubrication system to provide sufficient lubricant to the brake assembly. Such a system would increase the brake's energy density capability and improves the brake assembly's durability characteristics.

SUMMARY OF THE DISCLOSURE

According to the present disclosure, a final drive having a lubrication system is provided. The final drive comprises an axle housing and a differential housing. The differential housing is in alignment with the axle housing, and they share a longitudinal axis. The final drive further comprises a lubricant ring having a lubricant ring inner diameter. The lubricant ring travels about an inner surface of the axle housing. Further, the final drive has a longitudinal axis region, defined as the region formed by the lubricant ring inner diameter. The lubrication system comprises a lubrication inlet in fluid communication with a lubricant outlet. The lubrication inlet is disposed in the axle housing to capture a portion of the lubricant ring. The lubricant outlet is disposed in the differential housing to distribute the portion of the lubricant ring generally to the longitudinal axis region.

Additionally, according to the present disclosure, a method for recirculating lubrication in a final drive is also provided. One step of the method is to capture a portion of the lubricant ring, and another step is to distribute the portion of the lubricant ring in a direction generally towards the longitudinal axis region.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
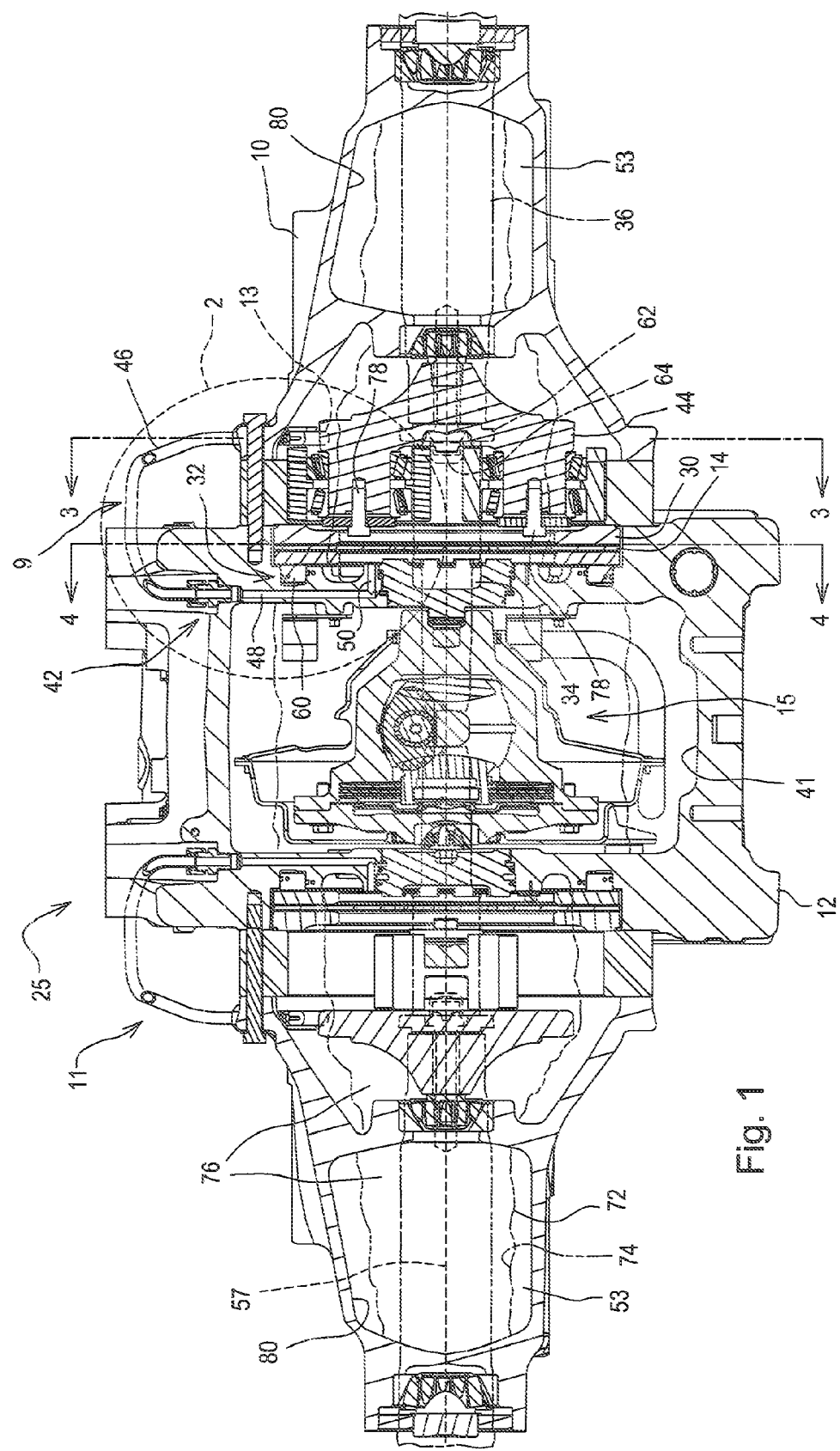
FIG. 1 is a sectional view of a final drive having a lubrication system.

FIG. 1 is a perspective view of a final drive 25 comprising a lubrication system 9 and a second lubrication system 11. The final drive 25 and the lubrication systems 9, 11 may be used in a work machine (not shown), such as an agricultural tractor or a construction machine. The lubrication systems 9, 11 may be identical mirror images of one another. They are both within the scope of the claims, but to avoid redundancy, however, only the lubrication system 9 is described in detail. The second lubrication system 11 is not separately described.

The final drive 25 comprises a differential gearset 15, a differential housing 12, an axle housing 10, a planetary gearset 17, and a brake assembly 32. An input shaft 34 transmits power from the differential gearset 15 to the planetary gearset 17, and an output shaft 36 transmits power from the planetary gearset 17 to the set of wheels (not shown). The planetary gearset 17 and the differential gearset 15 operate in conjunction with a lubricant 53, such as oil. The differential housing 12 is in alignment with the axle housing 10, and they share a longitudinal axis 57. Exemplarily, the axle housing 10 and the differential housing 12 sandwich a ring gear 22. The axle housing 10 has an inner surface 80, and the differential housing 12 has an inner surface 41.

The planetary gearset 17 and a friction disc 14 may rotate at a low speed. A low speed is one that does not cause the lubricant 53 to form a lubricant ring 72. As such, the lubricant 53 is generally level in the axle housing 10 and may be as high as the longitudinal axis 57 of the axle housing 10 or above. During such conditions, the friction disc 14 and the planetary gearset 17 are, at least, partially submerged in the lubricant 53. Thus, the lubricant 53 is available for lubricating and cooling the surfaces of the friction disc 14 and the planetary gearset 17 as they rotate.

In FIG. 1, the planetary gearset 17 and the friction disc 14 are rotating a high speed, rather than a low speed as just described. A high speed is one that causes the lubricant 53 to form the lubricant ring 72. As the lubricant 53 rotates, centrifugal forces develop causing the lubricant 53 to travel in a radial direction away from the longitudinal axis 57. Accordingly, the lubricant 53 travels in a rotational direction and a radial direction, which ultimately causes the lubricant 53 to travel about the inner surface 80 of the axle housing 10 and the inner surface 41 of the differential housing 12 (see arrow 19 in FIG. 3 or FIG. 4). When this occurs, the lubricant 53 travels in the form of the lubricant ring 72.

Under these circumstances, it is difficult for the lubricant 53 to reach the entirety of the friction disc 14. This is because the lubricant ring inner diameter 74 may be larger than inner diameter 82 of the friction disc 14 (see FIG. 4). At such times, the friction disc 14, in the area between the lubricant ring inner diameter 74 and the inner diameter 82, is starved of the lubricant 53 (see FIG. 4). Such starvation may result in premature failure of the friction disc 14. To avoid this, the lubrication system 9 provides the lubricant 53 to an inner diameter region 88 of the friction disc 14. The inner diameter region 88 is the region formed by the lubricant ring inner diameter 74 on the inboard and outboard sides 18, 20 (see FIG. 4).

Figure 2:
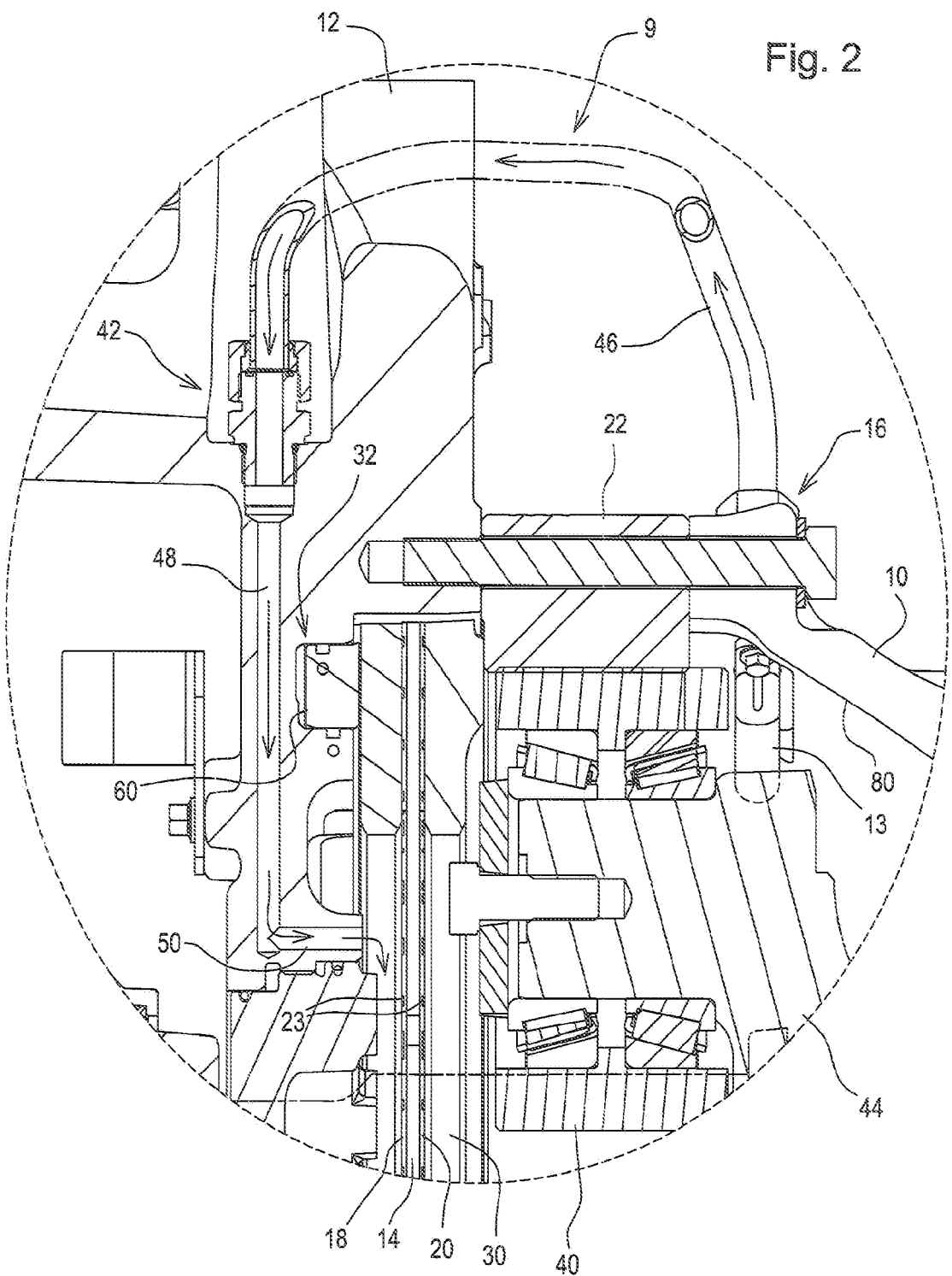
FIG. 2 is an enlarged sectional view, signified by circle 2 of FIG. 1, of the final drive having a lubrication system.

Referring to FIG. 2, there is shown an enlarged sectional view, indicated by circle 2 of FIG. 1, of the final drive 25 having the lubrication system 9. In FIG. 2, the planetary gearset 17 and the friction disc 14 are again rotating at a high speed. The lubrication system 9 comprises a lubrication inlet 13, a conduit 46, a passage 48, and a lubrication outlet 50. The lubrication inlet 13 is disposed in the axle housing 10 to capture a portion of the lubricant ring 72 and is in fluid communication with the lubrication outlet 50. The lubrication inlet 13 may be a generally V-shaped or L-shaped fitting, and it may have a threaded portion that engages with the axle housing 10. A first fitting 16 is positioned between the lubrication inlet 13 and the conduit 46. The first fitting 16 may have a threaded portion that engages with the axle housing 10, and it may also have a portion that engages and tightens to form a seal with the conduit 46. The conduit 46 is positioned between the lubrication inlet 13 and the passage 48.

A second fitting 42 is positioned between the conduit 46 and the passage 48. The second fitting 42 may have a threaded portion that engages with the differential housing 12, and it may also have a portion that engages and tightens to form a seal with the conduit 46. The conduit 46 may be substantially outside of the axle housing 10, and it may be made out of rubber or steal. The passage 48 is positioned between the second fitting 42 and the lubrication outlet 50. The passage 48 may be machined into the differential housing 12.

The lubrication outlet 50 is disposed within the differential housing 12. The lubrication outlet 50 may be drilled into the differential housing 12 or may be a fitting. The final drive 25 comprises a longitudinal axis region 76. The longitudinal axis region 76 is the region formed by the lubricant ring inner diameter 74 about the longitudinal axis 57. The lubrication outlet 50 of the lubrication system 9 distributes the portion of the lubricant ring 72 generally to the longitudinal axis region 76. More specifically, the lubrication outlet 50 distributes the portion of the lubricant ring 72 to the inner diameter region 88 of the friction disc 14. Ultimately, the lubrication system 9 distributes the portion of the lubricant ring 72, resulting in an increase in the brake's energy density and an improvement in the brake assembly's durability.

Figure 3:
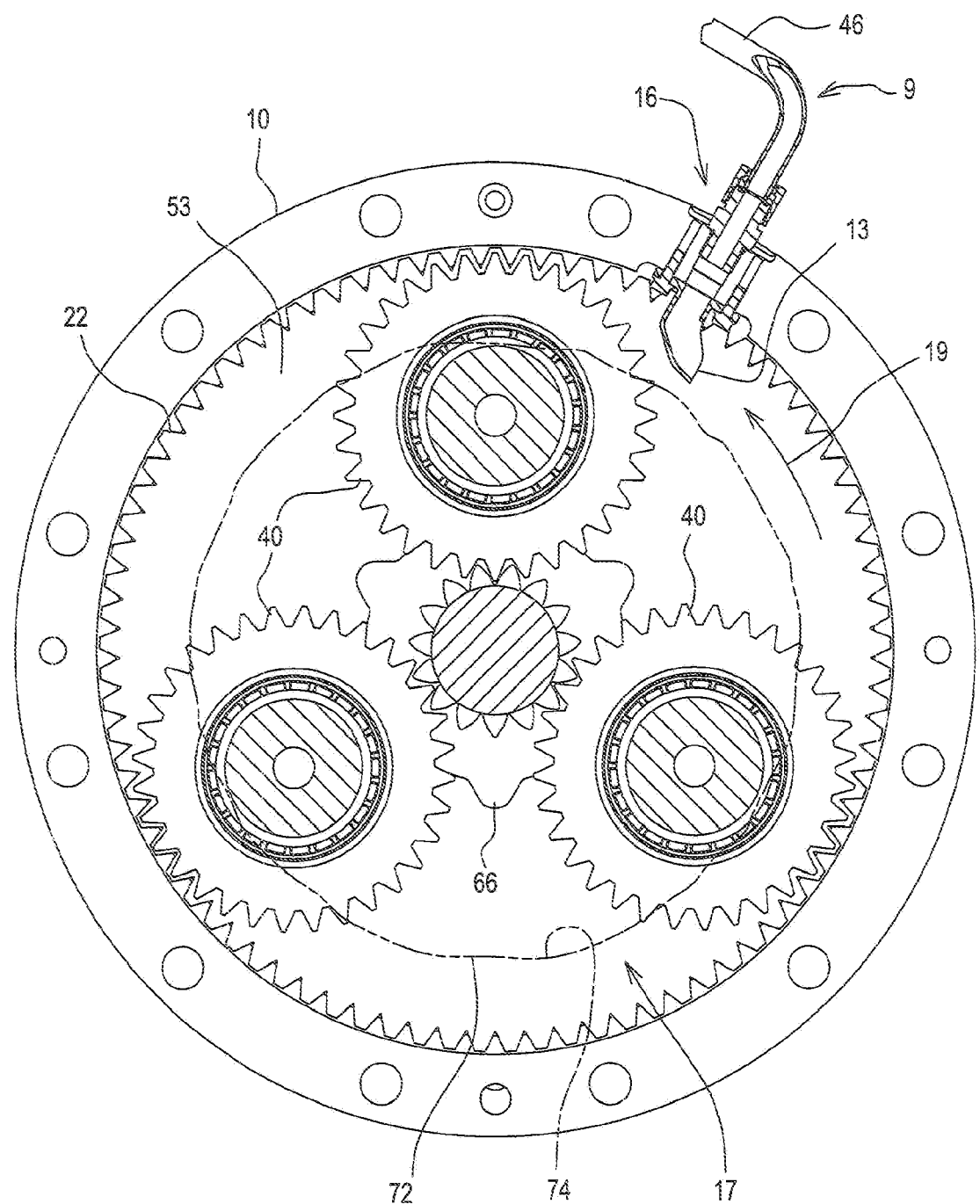
FIG. 3 is an enlarged sectional view, along line 3-3 of FIG. 1, of a planetary gearset of the final drive having a lubrication system.

Referring to FIG. 3 is an enlarged sectional view, along line 3-3 of FIG. 1, showing the planetary gearset 17 of the final drive 25. Here, the planetary gearset 17 and the friction disc 14 are again rotating a high speed. At the center of the planetary gearset 17, there is a sun gear 66. The sun gear 66 may be mounted about the input shaft 34 or formed into the input shaft 34. Planets 40 and a carrier 44 rotate about the sun gear 66. The ring gear 22 surrounds other parts of the planetary gearset 17. The planets 40 are meshed between the ring gear 22 and the sun gear 66, and the planets 40 turn on pins 78 about an axis and about the sun gear 66. The pins 78 are engaged with the carrier 44 to ensure that the planets 40 are held in a spaced relationship. The carrier 44 may be connected to the output shaft 36 via a plate 62 and a fastener 64.

Figure 4:
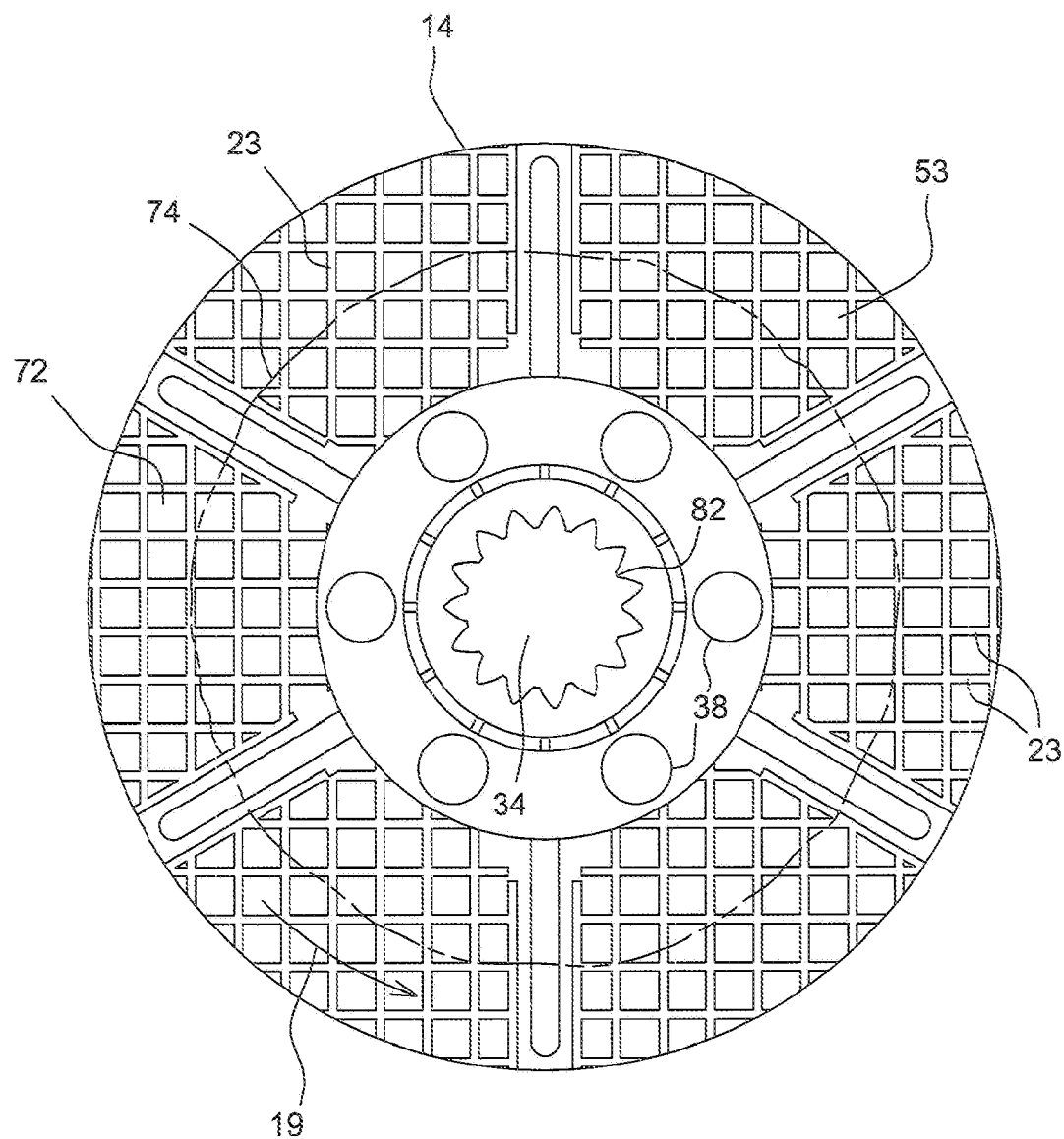
FIG. 4 is an enlarged sectional view, along line 4-4 of FIG. 1, of a friction disc for use in a brake assembly of the final drive having a lubrication system.

Referring to FIG. 4, there is shown an enlarged sectional view of the brake assembly 32 of the final drive 25 along line 4-4 of FIG. 1. The input shaft 34 is disposed within the differential housing 12. The friction disc 14 is splined to the input shaft 34 and is fixed for rotation therewith. Further, the friction disc 14 has an inboard side 18 and an outboard side 20, wherein the inboard side 18 is the side facing the differential housing 12, and the outboard side 20 is the side facing the axle housing 10. To prevent rotation of the input shaft 34, a piston 60, and a reaction plate 30 sandwich the friction disc 14.

The friction disc 14 has grooves 23 on the inboard side 18 and the outboard side 20. The grooves 23 provide a path for the lubricant 53 to flow in radial direction across the friction disc 14. Also, holes 38 provide a path for the lubricant 53 to flow between the inboard and outboard sides 18, 20. Exemplarily, the friction disc 14 has six holes 38.

Additionally, a method for recirculating lubrication in a final drive is disclosed. One step is to capture the portion of the lubricant ring 72. Another step is to channel the lubricant 53 through the conduit 46, the passage 48, and the lubrication outlet 50. Yet another step is to distribute the portion of lubricant ring 72 in a direction generally towards the longitudinal axis region 76. An additional step is to guide the lubricant 53 in a direction generally towards the inner diameter region 88 of the friction disc 14 on the inboard side 18 of the friction disc 14.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A final drive having a lubrication system, the final drive comprising an axle housing having an inner surface; a differential housing, wherein the axle housing and the differential housing share a longitudinal axis; a lubricant ring having a lubricant ring inner diameter traveling about the inner surface; a longitudinal axis region, wherein the longitudinal axis region is a region formed by the lubricant ring inner diameter about the longitudinal axis; and the lubrication system, comprising:

a lubrication inlet disposed in the axle housing to capture a portion of the lubricant ring; and a lubrication outlet in fluid communication with the lubrication inlet, wherein the lubrication outlet is disposed within the differential housing, and the lubrication outlet distributes the portion of the lubricant ring generally to the longitudinal axis region.

2. The final drive of claim 1, further comprising a shaft disposed within at least one of the axle housing and the differential housing; and a friction disc mounted about the shaft and fixed for rotation therewith.

3. The final drive of claim 2, wherein:
the friction disc has an inboard side and an outboard side, wherein the inboard side is the side facing the differential housing, and the outboard side is the side facing the axle housing;
the friction disc has an inner diameter region, wherein the inner diameter region is the region formed by the lubricant ring inner diameter on the inboard and outboard sides; and
the lubrication outlet distributes the portion of the lubricant ring to the inboard side of the inner diameter region of the friction disc.

4. The final drive of claim 1, wherein the lubrication inlet is a generally V-shaped fitting.

5. The final drive of claim 1, further comprising a conduit and a passage, wherein the conduit is positioned between the lubrication inlet and the passage, the conduit is substantially outside of the axle housing, the passage is positioned between the conduit and the lubrication outlet, and the passage is formed into the differential housing.

6. The final drive of claim 5, further comprising:
a first fitting positioned between the lubrication inlet and the conduit, and
a second fitting positioned between the conduit and the passage.

7. The final of claim 6, further comprising:
a shaft disposed within at least one of the housings; and
a friction disc mounted about the shaft and fixed for rotation therewith, wherein:
the friction disc has an inboard side, an outboard side, and an inner diameter region;
the inboard side is the side facing the differential housing;
the outboard side is the side facing the axle housing;
the inner diameter region is the region formed by the lubrication ring inner diameter on the inboard and outboard sides of the friction disc; and
the lubrication outlet distributes the portion of the lubrication ring to the inboard side of the inner diameter region of the friction disc.

8. A final drive having a lubrication system, the final drive comprising an axle housing having an inner surface; a differential housing in alignment with the axle housing; a lubrication ring having a lubricant ring inner diameter traveling about the inner surface; a shaft disposed within at least one of the housings; a friction disc having an inner diameter region mounted about the shaft and fixed for rotation therewith, wherein the inner diameter region is the region formed by the lubrication ring inner diameter; and the lubrication system, comprising:
a lubrication inlet disposed in the axle housing, wherein the lubrication inlet projects into the lubrication ring to capture a portion of the lubrication ring; and
a lubrication outlet in fluid communication with the lubrication inlet, wherein the lubrication outlet distributes the portion of the lubricant ring in a direction generally towards the inner diameter region of the friction disc.

9. The final drive of claim 8, wherein the lubrication outlet is disposed in the differential housing.

10. The final drive of claim 8, wherein:
the friction disc has an inboard side and an outboard side, the inboard side facing the differential housing, and the outboard side facing the axle housing;
the lubricant ring travels about the outboard side of the friction disc;
the lubrication inlet is disposed on the outboard side of the friction disc; and
the lubrication outlet distributes the lubricant to the inboard side of the friction disc.

11. The final drive of claim 8, wherein the friction disc is a brake disc.

12. The final drive of claim 8, further comprising a conduit and a passage, wherein the conduit is positioned between the lubrication inlet and the passage, the conduit is substantially outside of the axle housing, the passage is positioned between the conduit and the lubrication outlet, and the passage is formed into the differential housing.

13. The final drive of claim 12, further comprising:
a first fitting positioned between the lubrication inlet and the conduit, and
a second fitting positioned between the conduit and the passage.

14. The final drive of claim 13, wherein the conduit is substantially outside of both the housing and the additional housing.

15. The final drive of claim 14, wherein the passage is drilled into the differential housing, and the lubrication outlet is cross drilled into the passage.

16. The final drive of claim 15, wherein:
the friction disc is a brake disc;
the lubricant ring travels about the outboard side of the friction disc;
the lubrication inlet is disposed on the outboard side of the friction disc; and
the lubrication outlet is disposed in the differential housing.

17. A method for recirculating lubrication in a final drive, the final drive having an axle housing having an inner surface; a differential housing in alignment with the axle housing, wherein the axle housing and the differential housing share a longitudinal axis; a lubricant ring traveling about the inner surface, wherein the lubricant ring has a lubricant ring inner diameter; a longitudinal axis region, wherein the longitudinal axis region is a region formed by the lubricant ring inner diameter about the longitudinal axis; the method comprising the steps of:
capturing a portion of the lubricant ring; and
distributing the portion of the lubricant ring in a direction generally towards the longitudinal axis region.

18. The method of claim 17, wherein the final drive further comprises a lubrication inlet, a conduit, a passage, and a lubrication outlet, wherein the conduit is between the lubricant inlet and the passage, and the passage is between the conduit and the lubrication outlet, and the method further comprises the further step of channeling the lubricant through the conduit, the passage, and the lubrication outlet.

* * * * *